US011206105B2

(12) United States Patent
Tang

(10) Patent No.: US 11,206,105 B2
(45) Date of Patent: Dec. 21, 2021

(54) DATA TRANSMISSION METHOD AND TERMINAL DEVICE

(71) Applicant: SHENZHEN HEYTAP TECHNOLOGY CORP., LTD., Guangdong (CN)

(72) Inventor: Hai Tang, Guangdong (CN)

(73) Assignee: SHENZHEN HEYTAP TECHNOLOGY CORP., LTD., Guangdong (CN)

(*) Notice: Subject to any disclaimer, the term of this patent is extended or adjusted under 35 U.S.C. 154(b) by 39 days.

(21) Appl. No.: 16/641,990

(22) PCT Filed: Sep. 7, 2017

(86) PCT No.: PCT/CN2017/100950
§ 371 (c)(1),
(2) Date: Feb. 25, 2020

(87) PCT Pub. No.: WO2019/047124
PCT Pub. Date: Mar. 14, 2019

(65) Prior Publication Data
US 2020/0358558 A1 Nov. 12, 2020

(51) Int. Cl.
*H04L 1/08* (2006.01)
*H04W 76/15* (2018.01)
(Continued)

(52) U.S. Cl.
CPC .............. *H04L 1/08* (2013.01); *H04L 1/1614* (2013.01); *H04L 5/0044* (2013.01);
(Continued)

(58) Field of Classification Search
None
See application file for complete search history.

(56) References Cited

U.S. PATENT DOCUMENTS 9,473,995 B1 10/2016 Ramamurthy et al.
2018/0368200 A1* 12/2018 Jin .................... H04W 76/15
(Continued)

FOREIGN PATENT DOCUMENTS

CN 105517043 A 4/2016
CN 105706387 A 6/2016
(Continued)

OTHER PUBLICATIONS

R2-1707712—Design of MAC CE for duplicate activation/deactivation, Huawei, HiSilicon—3GPP TSG RAN WG2 #99—Berlin, Germany, Aug. 21-25, 2017 (2 pages).
(Continued)

*Primary Examiner* — Otis L Thompson, Jr.
(74) *Attorney, Agent, or Firm* — Perkins Coie LLP

(57) ABSTRACT

A method for transmitting data includes: a terminal device obtains transmission control information of each network device among at least one network device, the transmission control information of each network device being used to indicate the state of a data duplication and transmission function configured by the corresponding network device for a first data radio bearer (DRB), the state being an active state or an inactive state; the terminal device updates a control variable according to the transmission control information of each network device, the control variable being used to maintain the states of the data duplication and transmission function configured by a plurality of network devices for the first DRB, the plurality of network devices including the at least one network device; and the terminal device controls the data duplication and transmission function of the first DRB according to the updated control variable.

18 Claims, 3 Drawing Sheets

(51) Int. Cl.
*H04L 1/16* (2006.01)
*H04L 5/00* (2006.01)
*H04W 72/04* (2009.01)
*H04W 80/02* (2009.01)

(52) U.S. Cl.
CPC ....... *H04W 72/0406* (2013.01); *H04W 76/15* (2018.02); *H04W 80/02* (2013.01)

(56) References Cited

U.S. PATENT DOCUMENTS

| | | | |
|---|---|---|---|
| 2020/0052826 A1* | 2/2020 | Han | H04L 5/00 |
| 2020/0092746 A1* | 3/2020 | Baek | H04W 28/06 |
| 2020/0120522 A1* | 4/2020 | Xiao | H04W 76/15 |
| 2020/0169917 A1* | 5/2020 | Tang | H04L 1/08 |
| 2020/0170072 A1* | 5/2020 | Xiao | H04L 1/08 |
| 2020/0267793 A1* | 8/2020 | Sharma | H04W 76/19 |
| 2020/0367091 A1* | 11/2020 | Xu | H04L 5/00 |
| 2020/0367305 A1* | 11/2020 | Jin | H04L 1/1867 |
| 2021/0144583 A1* | 5/2021 | Xiao | H04L 5/00 |
| 2021/0152296 A1* | 5/2021 | Chen | H04L 1/189 |

FOREIGN PATENT DOCUMENTS

| | | |
|---|---|---|
| CN | 106332046 A | 1/2017 |
| EP | 3122097 A1 | 1/2017 |

OTHER PUBLICATIONS

R2-1707715—Enhancements for DL packet duplication, Huawei, HiSilicon, 3GPP TSG-RAN2 #99—Berlin, Germany, Aug. 21-25, 2017 (3 pages).

Second Office Action dated Apr. 16, 2020 of Chinese Patent Application No. 201780049120.2 (16 pages).

Supplementary European Search Reported dated Apr. 23, 2020 of EPO Application No. 17924666 (10 pages).

Tdoc R2-1706630—Split SRB: Remaining issues of initial state, path selection and duplication, Ericsson—3GPP TSG-RAN WG2 NR AH#2—Qingdao, P.R. of China, Jun. 27-29, 2017 (3 pages).

First Office Action dated Feb. 3, 2020 of CN201780049120.2 (20 pages).

International Search Report dated Nov. 21, 2017 of PCT/CN2017/100950 (2 pages).

R2-1706344—The impact of duplication on MAC, Qingdao, China, Jun. 27-29, 2017 (3 pages).

R2-1706716—Configuration and control of packet duplication, Huawei, HiSilicon, Qingdao, China, Jun. 27-29, 2017 (6 pages).

* cited by examiner

DATA TRANSMISSION METHOD AND TERMINAL DEVICE

CROSS-REFERENCE TO RELATED APPLICATION

The present application is a U.S. National Phase Entry of International PCT Application No. PCT/CN2017/100950, having an international filing date of Sep. 7, 2017, the entire content of which is hereby incorporated by reference.

TECHNICAL FIELD

Implementations of the present disclosure relate to the field of communication, and more particularly, relate to a method and terminal device for transmitting data.

BACKGROUND

In current discussion of New radio (NR), for a radio bearer configured with a data duplication and transmission function, the data duplication and transmission function of a bearer may be dynamically activated or deactivated. For a case of multi-connectivity, multiple network devices may respectively indicate to a terminal device to activate or deactivate the data duplication and transmission function of a bearer of the terminal. This may result in that states of the data duplication function indicated by different network devices for the same bearer are different. Therefore, a method is urgently needed to control the data duplication and transmission function of a bearer in the above scenario.

SUMMARY

In view of the above, implementations of the present disclosure provide a method and terminal device for transmitting data.

In a first aspect, a method for transmitting data is provided. The method includes: a terminal device acquires transmission control information of each network device in at least one network device, wherein the transmission control information of the each network device is used for indicating a state of a data duplication and transmission function configured by a corresponding network device for a first data radio bearer (DRB), and the state is an active state or an inactive state; the terminal device updates a control variable according to the transmission control information of the each network device, wherein the control variable is used for maintaining states of the data duplication and transmission function configured by multiple network devices for the first DRB, and the multiple network devices include the at least one network device; and the terminal device controls the data duplication and transmission function of the first DRB according to the updated control variable.

The activation state of the data duplication and transmission function means that a PDCP entity corresponding to a data radio bearer (DRB) may duplicate one PDCP PDU into two ones to be transmitted on two RLC entities respectively. The inactive state of the data duplication and transmission function means that the data duplication and transmission function is not used, that is, the PDCP PDU transmitted by the PDCP entity corresponding to an RB is not duplicated data, and may be transmitted once in an RLC entity.

In one possible implementation, controlling, by the terminal device, the data duplication and transmission function of the first DRB according to the updated control variable, includes: the terminal device determines a target state of the data duplication and transmission function of the first DRB according to the updated control variable and a first mapping relation table, wherein the first mapping relation table includes a mapping relation between multiple state combinations and multiple target states, and each state in a state combination corresponds to each of the multiple network devices one by one; and the terminal device controls the data duplication and transmission function of the first DRB according to the target state.

In one possible implementation, the method further includes: the terminal device receives the first mapping relation table sent by a first network device in the multiple network devices.

In one possible implementation, the first mapping relation table is carried in radio resource control (RRC) signaling.

In one possible implementation, the transmission control information of the first network device in the at least one network device indicates the state of the data duplication and transmission function configured by the first network device for the first DRB through a first bit in a bitmap, and acquiring, by the terminal device, the transmission control information of the each network device in the at least one network device, includes: the terminal device receives the bitmap sent by the first network device; and the terminal device determines a value of the first bit corresponding to the first DRB in the bitmap as the transmission control information of the first network device.

In other words, one bit in the bitmap may be used to represent the state of the data duplication and transmission function of a bearer, or two bits in the bitmap may be used to represent the state of the data duplication and transmission function of a bearer.

In one possible implementation, controlling, by the terminal device, the data duplication and transmission function of the first DRB according to the target state, includes: if the target state is the active state, the terminal device controls the first DRB to transmit duplicated data; and if the target state is the inactive state, the terminal device controls the first DRB to transmit non-duplicated data.

In one possible implementation, the transmission control information is carried in media access control (MAC) signaling.

In one possible implementation, the multiple network devices include a network device in a master cell group and a network device in a secondary cell group.

In a second aspect, a terminal device is provided, which is used for performing the method of the above first aspect or the method in any possible implementation of the above first aspect. Specifically, the terminal device includes units for executing the method of the above first aspect or the method in any possible implementation of the above first aspect.

In a third aspect, a terminal device is provided, including a memory, a processor, an input interface and an output interface. The memory, the processor, the input interface and the output interface are connected through a bus system. The memory is used for storing instructions, and the processor is used for executing the instructions stored in the memory to perform the method of the above first aspect or any possible implementation of the above first aspect.

In a fourth aspect, a computer storage medium is provided for storing computer software instructions for executing the method of the first aspect or any possible implementation of the first aspect, and the computer software instructions include programs designed for executing the above various aspects.

In a fifth aspect, a computer program product containing instructions is provided, which, when run on a computer, cause the computer to perform the method of the above first aspect or any optional implementation of the above first aspect.

These aspects or other aspects of the present disclosure will be more easily understood from following descriptions of the implementations.

DETAILED DESCRIPTION

Figure 1:
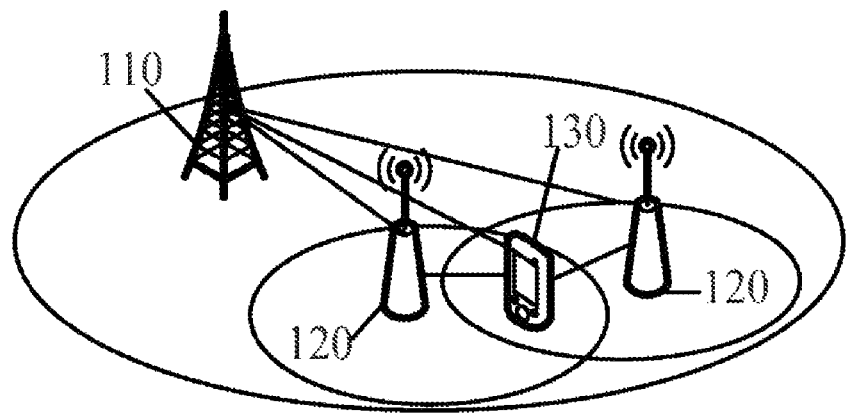
FIG. 1 shows a schematic diagram of an application scenario according to an implementation of the present disclosure.

Technical solutions in implementations of the present disclosure will be clearly and completely described below with reference to the drawings in the implementations of the present disclosure.

It should be understood that the technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, a LTE Time Division Duplex (TDD) system, a Universal Mobile Telecommunication System (UMTS), a Worldwide Interoperability for Microwave Access (WiMAX) communication system, a New Radio (NR) or future 5G system, etc.

In particular, the technical solutions of the implementations of the present disclosure can be applied to various communication systems based on non-orthogonal multiple access technologies, such as a Sparse Code Multiple Access (SCMA) system, and a Low Density Signature (LDS) system, etc. Of course, the SCMA system and the LDS system may be referred to as other names in the communication field. Further, the technical solutions of the implementations of the present disclosure can be applied to multicarrier transmission systems employing non-orthogonal multiple access technologies, such as an Orthogonal Frequency Division Multiplexing (OFDM) system, a Filter Bank Multi-Carrier (FBMC) system, a Generalized Frequency Division Multiplexing (GFDM) system, and a Filtered OFDM (F-OFDM) system, etc., which employ non-orthogonal multiple access technologies.

A terminal device in an implementation of the present disclosure may refer to a User Equipment (UE), an access terminal, a subscriber unit, a subscriber station, a mobile station, a mobile site, a remote station, a remote terminal, a mobile device, a user terminal, a terminal, a wireless communication device, a user agent or a user apparatus. An access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device or other processing device connected to a wireless modem, an on-board device, a wearable device, a terminal device in a future 5G network, or a terminal device in a future evolved Public Land Mobile Network (PLMN), etc., and implementations of the present disclosure are not limited thereto.

A network device in implementations of the present disclosure may be a device for communicating with a terminal device, and the network device may be a Base Transceiver Station (BTS) in GSM or CDMA, or may be a NodeB (NB) in a WCDMA system, or may be an Evolutional NodeB (eNB or eNodeB) in an LTE system, or may be a wireless controller in a scenario of a Cloud Radio Access Network (CRAN), or the network device may be a relay station, an access point, an on-board device, a wearable device, a network device in a future 5G network, or a network device in a future evolved PLMN network, etc., and implementations of the present disclosure are not limited thereto.

FIG. 1 is a schematic diagram of an application scenario according to an implementation of the present disclosure. Network devices around the terminal device 130 in FIG. 1 include a primary network device 110 and at least one secondary network device 120. The at least one secondary network device 120 is respectively connected with the primary network device 110 to form a multi-connectivity, and is respectively connected with the terminal device 130 to provide services for the terminal device 130. The primary network device 110 may be an LTE network, and the secondary network device 120 may be an NR network. Alternatively, the primary network device 110 may be an NR network, and the secondary network device 120 may be an LTE network. Alternatively, both the primary network device 110 and the secondary network device 120 are NR networks. The present disclosure does not limit the application scenarios of the technical solutions. The terminal device 130 may simultaneously establish connections through the primary network device 110 and the secondary network device 120. The connection established between the terminal device 130 and the primary network device 110 is a primary connection, and the connection established between the terminal device 130 and the secondary network device 120 is a secondary connection. Control signaling of the terminal device 130 may be transmitted through the primary connection, while data of the terminal device may be transmitted simultaneously through the primary connection and the secondary connection, or may be transmitted through the secondary connection only.

In implementations of the present disclosure, the primary network device may be, for example, a Macrocell, and the secondary network device may be, for example, a Microcell, a Picocell, or a Femtocell, and the implementations of the present invention are not limited thereto.

More specifically, the primary network device may be an LTE network device and the secondary network device may be an NR network device. It should be understood that the implementations of the present invention are not limited thereto. The primary network device may otherwise be a GSM network device, or a CDMA network device, etc. The secondary network device may otherwise be a GSM network device, or a CDMA network device, etc. The implementations of the present invention are not limited thereto.

In a carrier aggregation scenario, a Packet Data Convergence Protocol (PDCP) may support the data duplication function, i.e., the data replication function of PDCP is utilized to make duplicated data correspond to two or more bearers, and finally it is ensured that multiple duplicated identical PDCP Protocol Data Units (PDUs) can be transmitted on different physical layer aggregated carriers, thus achieving frequency diversity gain to improve reliability of data transmission.

Figure 2:
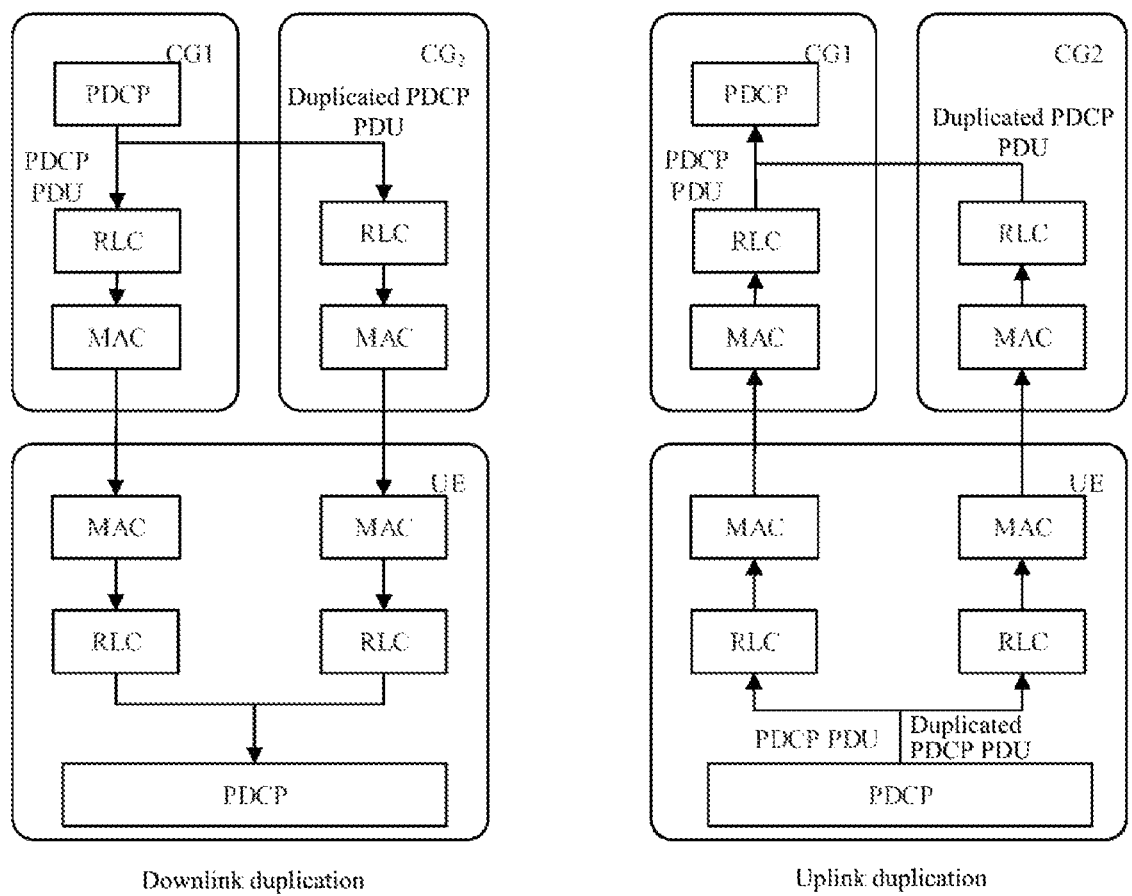
FIG. 2 shows a schematic diagram of protocol architecture of a data duplication and transmission mode in a dual-connectivity scenario.

For ease of understanding, the protocol architecture of the data duplication and transmission mode in a dual-connectivity scenario will be briefly described below with reference to FIG. 2. The data duplication and transmission mode adopts a protocol architecture of a split bearer. For uplink and downlink, the PDCP is located in a certain Cell Group (CG), which is an anchor CG, wherein CGs includes a master cell group and a secondary cell group. The PDCP duplicates a PDCP PDU into two identical ones, for example, one PDCP PDU and one duplicated PDCP PDU. The two PDCP PDUs pass through Radio Link Control (RLC) and Media Access Control (MAC) of different CGs, then reach a corresponding MAC layer and RLC layer of the terminal (downlink) or base station (uplink) through an air interface, and at last converge to the PDCP. The PDCP layer detects that the two PDCP PDUs are identical duplication versions, discards one of them, and submits the other one to a higher layer. The bearer respectively connecting the two RLC and MAC under the PDCP is called a split bearer.

In current discussion of New radio (NR), for a radio bearer configured with a data duplication and transmission function, the data duplication and transmission function of a bearer may be dynamically activated or deactivated through a Media Access Control (MAC) Control Element (CE). For a dual-connectivity scenario, a network device of the master cell group and a network device of the secondary cell group may respectively send the MAC CE to activate or deactivate the data duplication function of a split bearer of the terminal, which may cause that the different network devices of the master cell group and the secondary cell group indicate different states for the data duplication function of a bearer of the terminal. For example, the network device of the master cell group indicates to activate the data duplication function of the split bearer while the network device of the secondary cell group indicates to deactivate the data duplication function of the split bearer. Therefore, how the terminal device controls the data duplication function of a split bearer based on the combination of configurations of the data duplication function by multiple network devices for the same split bearer is a problem to be solved.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "|" in this document generally indicates that objects before and after the symbol "|" have an "or" relationship.

Figure 3:
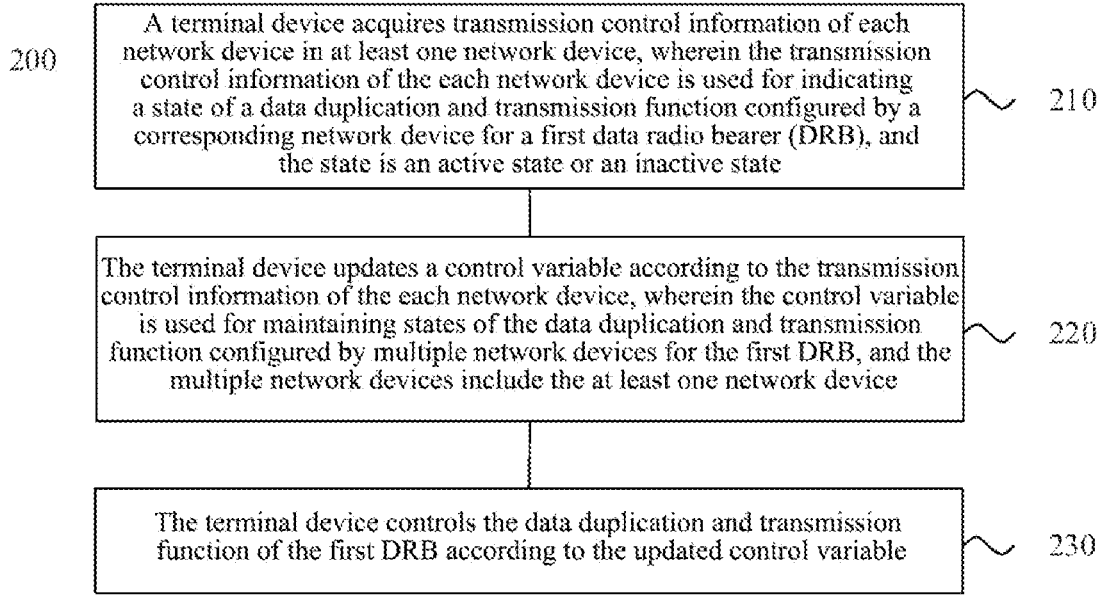
FIG. 3 shows a schematic block diagram of a method for transmitting data according to an implementation of the present disclosure.

FIG. 3 is a schematic block diagram of a method 200 for transmitting data according to an implementation of the present disclosure. As shown in FIG. 3, the method 200 includes some or all of the following contents.

In 210, a terminal device acquires transmission control information of each network device in at least one network device, wherein the transmission control information of the each network device is used for indicating a state of a data duplication and transmission function configured by a corresponding network device for a first data radio bearer (DRB), and the state is an active state or an inactive state.

In 220, the terminal device updates a control variable according to the transmission control information of the each network device, wherein the control variable is used for maintaining states of the data duplication and transmission function configured by multiple network devices for the first DRB, and the multiple network devices include the at least one network device.

In 230, the terminal device controls the data duplication and transmission function of the first DRB according to the updated control variable.

Specifically, the terminal device may maintain a control variable for each split bearer configured with the data duplication and transmission function, for example, the control variable may save the latest states of the data duplication and transmission function configured for a split bearer by all network devices capable of activating or deactivating the split bearer of the terminal device. Every time when the terminal device receives information, sent by one or more network devices, for indicating the state of the data duplication and transmission function of a split bearer, the terminal device may update the control variable, and the terminal device may directly control the data duplication and transmission function of the split bearer according to the updated control variable and some rules agreed in advance. For example, assuming that all network devices capable of activating or deactivating split bearer 1 are 2 network devices, including network device 1 and network device 2, if the updated control variable is an active state configured by one network device and an inactive state configured by the other network device, the terminal device may directly activate the data duplication and transmission function of the split bearer 1.

Therefore, the method for transmitting data in the implementation of the present disclosure is beneficial to improving the performance of data transmission by controlling the data duplication and transmission function of a bearer through the control variable maintained for the bearer of the terminal device.

The active state of the data duplication and transmission function means that a PDCP entity corresponding to a data radio bearer (DRB) may duplicate one PDCP PDU into two ones to be transmitted on two RLC entities respectively. The inactive state of the data duplication and transmission function means that the data duplication and transmission function is not used, that is, the PDCP PDU transmitted by the PDCP entity corresponding to a DRB is not duplicated data, and may be transmitted once in an RLC entity.

In the implementation of the present disclosure, the terminal device may maintain one control variable for each split bearer configured with the data duplication and transmission function, that is, assuming that the terminal device has four split bearers configured with the data duplication and transmission function, the terminal device may respectively maintain one control variable for each of the four split bearers, that is, maintain four control variables. In the implementation of the present disclosure, the technical solution is described from the perspective of one split bearer, but implementations of the present disclosure are not limited thereto.

Those skilled in the art would understand that the dual-connectivity mentioned in the implementations of the present disclosure may otherwise be multi-connectivity. Although many parts of the disclosure are described by taking the dual-connectivity as an example, the implementations of the present disclosure are not limited thereto.

Optionally, the terminal device may simultaneously receive the indication information sent respectively by the primary network device and the secondary network device at a particular moment. As an example, the indication information is one bit. At a particular moment, the terminal device receives indication information 1 sent by the primary network device and indication information 0 sent by the secondary network device, wherein 1 may indicate that the data duplication and transmission function configured for a split bearer is in an active state, while 0 may indicate that the data duplication and transmission function configured for the corresponding split bearer is in an inactive state, then the terminal device may directly update the control variable as 10, and the terminal device may directly control the data duplication and transmission function of the corresponding bearer according to 10.

Optionally, the terminal device may receive the indication information sent respectively by the primary network device and the secondary network device at different moments. After receiving the indication information sent by one network device, the terminal device may first not change the data duplication and transmission function of the corresponding split bearer until the terminal device receives the indication information sent by the other network device, and then updates the control variable based on the combination of the indication information, and controls the data duplication and transmission function of the corresponding split bearer according to the updated control variable.

Optionally, the terminal device may update the control variable after receiving the indication information sent by one network device, and directly control the data duplication and transmission function of the corresponding split bearer according to the updated control variable, wherein the control variable may have an initial value, for example, the initial value of the control variable may be 00.

Optionally, in the implementation of the present disclosure, controlling, by the terminal device, the data duplication and transmission function of the first DRB according to the updated control variable, includes: the terminal device determines a target state of the data duplication and transmission function of the first DRB according to the updated control variable and a first mapping relation table, wherein the first mapping relation table includes a mapping relation between multiple state combinations and multiple target states, and each state in a state combination corresponds to each of the multiple network devices one by one; and the terminal device controls the data duplication and transmission function of the first DRB according to the target state.

Specifically, the terminal device may save a mapping relation table in advance for each split bearer configured with the data duplication and transmission function, and the mapping relation table may include various combinations of states that may be configured by all network devices capable of activating or deactivating a corresponding split bearer for the data duplication and transmission function of the corresponding split bearer, and target states that the data duplication and transmission function of the corresponding split bearer should be in under the various combinations of states. The updated control variable of the terminal device is a combination of states. The terminal device may search in the corresponding mapping relation table according to the updated control variable, to find the corresponding target state, and then directly control the data duplication and transmission function of the corresponding split bearer according to the target state. As an example, a bit represents a state of the data duplication and transmission function of a split bearer configured by a network device, and the mapping relation table for a split bearer may be table 1.

TABLE 1

| Primary network device | Secondary network device | Target state |
| --- | --- | --- |
| 0 | 0 | Inactive |
| 0 | 1 | Active |
| 1 | 0 | Active |
| 1 | 1 | Active |

In other words, if the updated control variable is 00, the data duplication and transmission function of the corresponding split bearer may be controlled to be in an inactive state, and if the updated control variable is 01, 10 or 11, the data duplication and transmission function of the corresponding split bearer may be controlled to be in an active state. An initial value of the control variable may be 00.

It should be understood that the above table is only an example and other forms may be used. For example, the target states corresponding to 01 and 10 may be modified to the inactive state. Moreover, the mapping relation table may be configured by a network device, for example, the network device may configure the mapping relation table for a terminal device through Radio Resource Control (RRC). That is, the network device may modify the target state corresponding to each combination through RRC.

It should further be understood that the above table includes all state combinations, alternatively, the above table may include part of the state combinations, for example, the primary network device and the secondary network device agree through negotiation that a certain network device directly controls the data duplication and transmission function of a certain split bearer. For example, the primary network device and the secondary network device may agree through negotiation that the primary network device controls the data duplication and transmission function of DRB 1, then state indication for the data duplication and transmission function of DRB1 sent by the primary network device to the terminal device may be on or off, that is, may be 0 or 1, while the state indication for the data duplication and transmission function of DRB1 sent by the secondary network device to the terminal device can only be off, for example, can only be 0. Then the mapping relation table configured by the network device for DRB1 can only be as shown in Table 2.

TABLE 2

| Primary network device | Secondary network device | Target state |
| --- | --- | --- |
| 0 | 0 | Inactive |
| 0 | 1 | Active |
| 1 | 0 | Active |

Moreover, for DRB1, since the primary network device and the secondary network device have agreed through negotiation a valid network device, the updated control variable can only be 00, 01 or 00, 10.

Optionally, in the implementation of the present disclosure, the transmission control information of a first network device in the at least one network device indicates the state of the data duplication and transmission function configured by the first network device for the first DRB through a first bit in a bitmap, and acquiring, by the terminal device, the transmission control information of the each network device in the at least one network device, includes: the terminal device receives the bitmap sent by the first network device; and the terminal device determines a value of the first bit corresponding to the first DRB in the bitmap as the transmission control information of the first network device.

The current NR discussion has agreed that DRBs with the data duplication and transmission function of the terminal device are indicated through a bitmap, and the bitmap is 1 byte. Different positions in the bitmap respectively correspond to different bearer identities (IDs) of the terminal, and the bearers identified by these bearer IDs are bearers configured with the data duplication and transmission function. For example, bearer IDs 0, 2, 3, 7, 8, 10 of a terminal are bearers with the data duplication and transmission function, and a corresponding relationship is that a first bit in the bitmap of the terminal corresponds to bearer ID 0, a second bit corresponds to bearer ID 2, a third bit corresponds to bearer ID 3, and a fourth bit corresponds to bearer ID 7, a fifth bit corresponds to bearer ID 8, a sixth bit corresponds to bearer ID 10, and a seventh bit and an eighth bit are invalid bits. This corresponding relationship may be in an ascending or descending order.

After receiving the bitmap sent by a network device, the MAC of the terminal device may indicate a corresponding bit in the bitmap to the PDCP of the corresponding DRB. Specifically, the terminal device may find the bit corresponding to the DRB ID in the bitmap according to the corresponding relationship between the bitmap and the DRB ID, for example, the network device makes the DRB IDs 1, 3, 4, 7 with the data duplication and transmission function correspond to the 1, 2, 3, 4 bits in the bitmap respectively. Then after receiving the bitmap, the MAC of the terminal device may indicate a value of the first bit to the PDCP of DRB ID 1, a value of the second bit to the PDCP of DRB ID 3, and so on.

Optionally, in the implementation of the present disclosure, controlling, by the terminal device, the data duplication and transmission function of the first DRB according to the target state, includes: if the target state is the active state, the terminal device controls the first DRB to transmit duplicated data; and if the target state is the inactive state, the terminal device controls the first DRB to transmit non-duplicated data.

Specifically, if the terminal device determines that the target state for a DRB is the active state according to Table 1 above, it means that the terminal device needs to use the DRB to receive duplicated data or send duplicated data. If the terminal device determines that the target state for a DRB is the inactive state according to Table 1 above, it means that the terminal device needs to use the DRB to receive non-duplicated data or send non-duplicated data.

Optionally, in the implementation of the present disclosure, the transmission control information is carried in media access control (MAC) signaling.

It is also mentioned above that the bitmap may be sent to the terminal device through MAC layer signaling, and a bit of the bitmap indicates the state of the data duplication and transmission function of a bearer.

It should be understood that various indication information or configuration information of the implementations of the present disclosure may be transmitted through other signaling besides the above-mentioned MAC layer signaling and RRC signaling, such as Download Control Information (DCI), etc.

It should also be understood that the above-mentioned multiple network devices are described by taking a network device of one master cell group and a network device of one secondary cell group as an example, and the implementations of the present disclosure should not be limited thereto, for example, the multiple network devices may be a network device of one master cell group and network devices of multiple secondary cell groups.

It should also be understood that one bit in the above bitmap represents the state of the data duplication and transmission function of one bearer, and the implementations of the present disclosure should not be limited thereto, for example, two bits may be used to represent the state of the data duplication and transmission function of one bearer.

It should be understood that interaction between the network device and the terminal device, and related characteristics and functions of the network device, etc., described for the network device correspond to related characteristics and functions of the terminal device. Moreover, the related contents have been described in detail in the above method 200, and will not be repeated here for the sake of brevity.

It should be understood that in various implementations of the present invention, values of sequence numbers in the above processes do not indicate an order of execution, and the order of execution of various processes should be determined by their functions and internal logics, and should not constitute any limitation to implementation processes of implementations of the present disclosure.

The method for transmitting data according to implementations of the present disclosure has been described in detail above. Devices for transmitting data according to implementations of the present disclosure will be described below with reference to FIGS. 4 and 5. Technical features described in the method implementations are applicable to the following device implementations.

Figure 4:
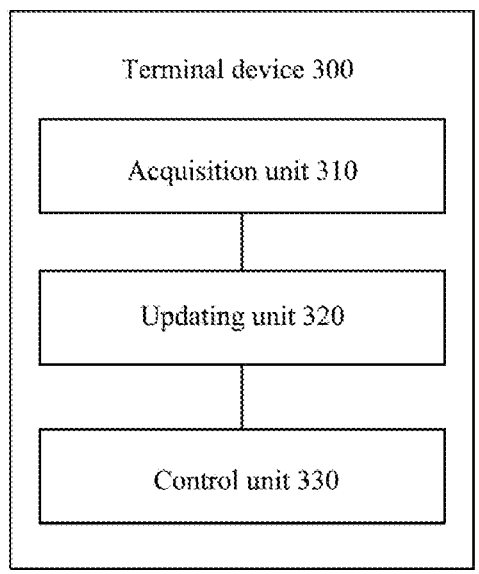
FIG. 4 shows a schematic block diagram of a terminal device for transmitting data according to an implementation of the present disclosure.

FIG. 4 shows a block diagram of a terminal device 300 according to an implementation of the present disclosure. As shown in FIG. 4, the terminal device 300 includes an acquisition unit 310, an updating unit 320 and a control unit 330.

The acquisition unit 310 is configured to acquire transmission control information of each network device in at least one network device, wherein the transmission control information of the each network device is used for indicating a state of a data duplication and transmission function configured by a corresponding network device for a first data radio bearer (DRB), and the state is an active state or an inactive state.

The updating unit 320 is configured to update a control variable according to the transmission control information of the each network device, wherein the control variable is used for maintaining states of the data duplication and transmission function configured by multiple network devices for the first DRB, and the multiple network devices include the at least one network device.

The control unit 330 is configured to control the data duplication and transmission function of the first DRB according to the updated control variable.

Therefore, the terminal device in the implementation of the present disclosure is beneficial to improving performance of data transmission by controlling the data duplication and transmission function of a bearer through the control variable maintained for the bearer of the terminal device.

Optionally, in the implementation of the present disclosure, the control unit is specifically configured to determine a target state of the data duplication and transmission function of the first DRB according to the updated control variable and a first mapping relation table, wherein the first mapping relation table includes a mapping relation between multiple state combinations and multiple target states, and each state in a state combination corresponds to each of the multiple network devices one by one; and control the data duplication and transmission function of the first DRB according to the target state.

Optionally, in the implementation of the present disclosure, the terminal device further includes a receiving unit configured to receive a first mapping relation table sent by a first network device in the multiple network devices.

Optionally, in the implementation of the present disclosure, the first mapping relation table is carried in radio resource control (RRC) signaling.

Optionally, in the implementation of the present disclosure, the transmission control information of the first network device in the at least one network device indicates the state of the data duplication and transmission function configured by the first network device for the first DRB through a first bit in a bitmap, and the acquisition unit is specifically configured to receive the bitmap sent by the first network device; and determine a value of the first bit corresponding to the first DRB in the bitmap as the transmission control information of the first network device.

Optionally, in the implementation of the present disclosure, the control unit is specifically configured to, if the target state is the active state, control the first DRB to transmit duplicated data; and if the target state is the inactive state, control the first DRB to transmit non-duplicated data.

Optionally, in the implementation of the present disclosure, the transmission control information is carried in media access control (MAC) signaling.

It should be understood that the terminal device 300 according to the implementation of the present disclosure may correspond to the terminal device in the method implementations of the present disclosure, and the above-mentioned and other operations and/or functions of various units in the terminal device 300 are respectively for realizing the corresponding processes of the terminal device in the method shown in FIG. 3, and will not be repeated here for brevity.

Figure 5:
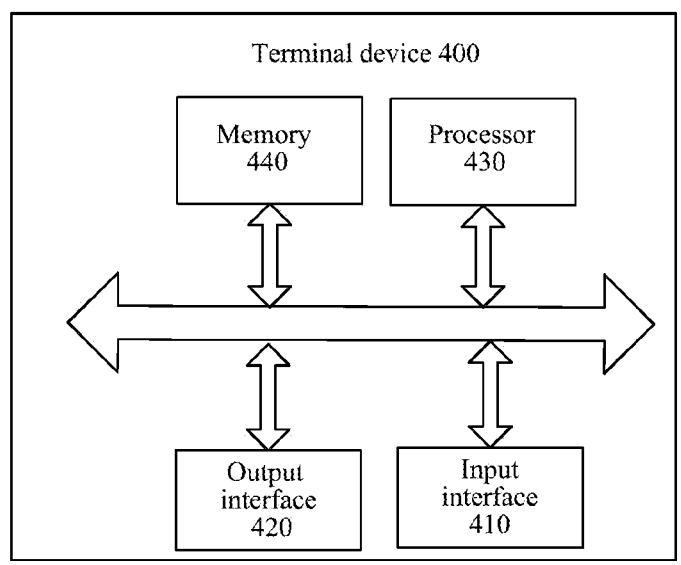
FIG. 5 shows another schematic block diagram of a terminal device for transmitting data according to an implementation of the present disclosure.

As shown in FIG. 5, an implementation of the present disclosure further provides a terminal device 400. The terminal device 400 may be the terminal device 300 in FIG. 4, which may be used for performing contents corresponding to the terminal device in the method 100 in FIG. 3. The terminal device 400 includes an input interface 410, an output interface 420, a processor 430, and a memory 440. The input interface 410, the output interface 420, the processor 430, and the memory 440 may be connected through a bus system. The memory 440 is used for storing programs, instructions, or codes. The processor 430 is used for executing programs, instructions, or codes in the memory 440 to control the input interface 410 to receive signals, to control the output interface 420 to send signals, and to accomplish the operations in the above method implementations.

Therefore, the terminal device in the implementation of the present disclosure is beneficial to improving performance of data transmission by controlling the data duplication and transmission function of a bearer through the control variable maintained for the bearer of the terminal device.

It should be understood that in an implementation of the present disclosure, the processor 430 may be a Central Processing Unit (CPU), or the processor 430 may be other general purpose processor, digital signal processor, application specific integrated circuit, field programmable gate array or other programmable logic device, discrete gate or transistor logic device, discrete hardware component, etc.

The general purpose processor may be a microprocessor, or the processor may be any conventional processor or the like.

The memory 440 may include a read-only memory and a random access memory, and provide instructions and data to the processor 430. A portion of memory 440 may include a non-volatile random access memory. For example, the memory 440 may also store information of device type.

In implementation processes, various contents of the methods described above may be accomplished by integrated logic circuits of hardware or instructions in the form of software in the processor 430. The contents of the method disclosed in connection with the implementations of the present disclosure may be directly embodied to be accomplished by an execution of the hardware processor or by the combination of hardware and software modules in the processor. The software modules may be located in a storage medium commonly used in the art, such as a random access memory, flash memory, read-only memory, programmable read-only memory or electrically erasable programmable memory, or register. The storage medium is located in the memory 440, and the processor 430 reads the information in the memory 440, and accomplishes the contents of the above method in combination with its hardware. In order to avoid repetition, it will not be described in detail here.

In a specific implementation, the acquisition unit, updating unit and control unit of the terminal device 300 may be implemented by the processor 430 in FIG. 5, and the receiving unit of the terminal device 300 may be implemented by the input interface 410 in FIG. 5.

Those of ordinary skill in the art will recognize that the exemplary elements and algorithm acts described in combination with the implementations disclosed herein can be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present disclosure.

Those skilled in the art may clearly understand that for convenience and conciseness of description, the specific working processes of the systems, apparatuses and units described above may refer to the corresponding processes in the method implementations and will not be described here.

In several implementations provided by the present disclosure, it should be understood that the disclosed systems, devices and methods may be implemented in other ways. For example, the apparatus implementation described above is only illustrative, for example, the division of the units is only a logical function division, and there may be other ways of division in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

The functions may be stored in a computer readable storage medium if implemented in a form of software functional units and sold or used as a separate product. Based on this understanding, the technical solution of the present disclosure, in essence, or the part contributing to the existing art, or the part of the technical solution, may be embodied in the form of a software product stored in a storage medium, including several instructions for causing a computer device (which may be a personal computer, a server, or a network device, etc.) to perform all or part of the acts of various implementations of the present disclosure. The aforementioned storage medium includes various media capable of storing program codes, such as a U disk, a mobile hard disk, a read-only memory (ROM), a random access memory (RAM), a magnetic disk, or an optical disk.

What are described above are merely exemplary implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be determined by the protection scope of the claims.

What is claimed is:

1. A method for transmitting data, comprising:
    acquiring, by a terminal device, transmission control information of each of at least one network device, wherein the transmission control information of the each of the at least one network device is used for indicating a state of a data duplication and transmission function configured by a corresponding network device for a first data radio bearer (DRB), and the state is an active state or an inactive state;
    updating, by the terminal device, a control variable according to the transmission control information of the each of the at least one network device, wherein the control variable is used for maintaining states of the data duplication and transmission function configured by a plurality of network devices for the first DRB, the terminal device maintains one control variable for each split bearer configured with the data duplication and transmission function, and the plurality of network devices comprise the at least one network device; and
    controlling, by the terminal device, the data duplication and transmission function of the first DRB according to the updated control variable;
    wherein controlling, by the terminal device, the data duplication and transmission function of the first DRB according to the updated control variable, comprises:
    determining, by the terminal device, a target state of the data duplication and transmission function of the first DRB according to the updated control variable and a first mapping relation table, wherein the first mapping relation table comprises a mapping relation between a plurality of state combinations and a plurality of target states, and each state in a state combination corresponds to each of the plurality of network devices one by one; wherein the terminal device saves a mapping relation table in advance for each split bearer configured with the data duplication and transmission function, and the mapping relation table includes combinations of states able to be configured by all network devices capable of activating or deactivating a corresponding split bearer for the data duplication and transmission function of the corresponding split bearer, and target states that the data duplication and transmission function of the corresponding split bearer should be in under the combinations of states; and
    controlling, by the terminal device, the data duplication and transmission function of the first DRB according to the target state.

2. The method of claim 1, wherein the method further comprises:
    receiving, by the terminal device, the first mapping relation table sent by a first network device in the plurality of network devices.

3. The method of claim 2, wherein the first mapping relation table is carried in Radio Resource Control (RRC) signaling.

4. The method of claim 3, wherein the transmission control information of a first network device in the at least one network device indicates the state of the data duplication and transmission function configured by the first network device for the first DRB through a first bit in a bitmap, and acquiring, by the terminal device, the transmission control information of the each network device in the at least one network device, comprises:
    receiving, by the terminal device, the bitmap sent by the first network device; and
    determining, by the terminal device, a value of the first bit corresponding to the first DRB in the bitmap as the transmission control information of the first network device.

5. The method of claim 2, wherein the transmission control information of the first network device in the at least one network device indicates the state of the data duplication and transmission function configured by the first network device for the first DRB through a first bit in a bitmap, and acquiring, by the terminal device, the transmission control information of the each network device in the at least one network device, comprises:
    receiving, by the terminal device, the bitmap sent by the first network device; and
    determining, by the terminal device, a value of the first bit corresponding to the first DRB in the bitmap as the transmission control information of the first network device.

6. The method of claim 1, wherein the transmission control information of a first network device in the at least one network device indicates the state of the data duplication and transmission function configured by the first network device for the first DRB through a first bit in a bitmap, and acquiring, by the terminal device, the transmission control information of the each of the at least one network device, comprises:
    receiving, by the terminal device, the bitmap sent by the first network device; and
    determining, by the terminal device, a value of the first bit corresponding to the first DRB in the bitmap as the transmission control information of the first network device.

7. The method of claim 1, wherein controlling, by the terminal device, the data duplication and transmission function of the first DRB according to the target state, comprises:
    controlling, by the terminal device, the first DRB to transmit duplicated data if the target state is the active state; and controlling, by the terminal device, the first DRB to transmit non-duplicated data if the target state is the inactive state.

8. The method of claim 1, wherein the transmission control information is carried in media access control (MAC) signaling.

9. The method of claim 1, wherein the plurality of network devices comprise a network device in a master cell group and a network device in a secondary cell group.

10. A terminal device, comprising a memory and a processor, wherein the processor is configured to execute instructions stored in the memory to perform following operations:
   acquiring transmission control information of each of at least one network device, wherein the transmission control information of the each of the at least one network device is used for indicating a state of a data duplication and transmission function configured by a corresponding network device for a first data radio bearer (DRB), and the state is an active state or an inactive state;
   updating a control variable according to the transmission control information of the each of the at least one network device, wherein the control variable is used for maintaining states of the data duplication and transmission function configured by a plurality of network devices for the first DRB, the terminal device maintains one control variable for each split bearer configured with the data duplication and transmission function, and the plurality of network devices comprise the at least one network device; and
   controlling the data duplication and transmission function of the first DRB according to the updated control variable;
   wherein controlling the data duplication and transmission function of the first DRB according to the updated control variable comprises:
   determining a target state of the data duplication and transmission function of the first DRB according to the updated control variable and a first mapping relation table, wherein the first mapping relation table comprises a mapping relation between a plurality of state combinations and a plurality of target states, and each state in a state combination corresponds to each of the plurality of network devices one by one; wherein the terminal device saves a mapping relation table in advance for each split bearer configured with the data duplication and transmission function, and the mapping relation table includes combinations of states able to be configured by all network devices capable of activating or deactivating a corresponding split bearer for the data duplication and transmission function of the corresponding split bearer, and target states that the data duplication and transmission function of the corresponding split bearer should be in under the combinations of states; and
   controlling the data duplication and transmission function of the first DRB according to the target state.

11. The terminal device of claim 10, wherein the terminal device further comprises:
   an input interface, configured to receive the first mapping relation table sent by a first network device in the plurality of network devices.

12. The terminal device of claim 11, wherein the first mapping relation table is carried in Radio Resource Control (RRC) signaling.

13. The terminal device of claim 12, wherein the transmission control information of a first network device in the at least one network device indicates the state of the data duplication and transmission function configured by the first network device for the first DRB through a first bit in a bitmap, and the processor is further configured to execute instructions stored in the memory to perform following operations:
   acquiring the bitmap sent by the first network device; and
   determining a value of the first bit corresponding to the first DRB in the bitmap as the transmission control information of the first network device.

14. The terminal device of claim 11, wherein the transmission control information of the first network device in the at least one network device indicates the state of the data duplication and transmission function configured by the first network device for the first DRB through a first bit in a bitmap, and the processor is further configured to execute instructions stored in the memory to perform following operations:
   acquiring the bitmap sent by the first network device; and
   determining a value of the first bit corresponding to the first DRB in the bitmap as the transmission control information of the first network device.

15. The terminal device of claim 10, wherein the transmission control information of a first network device in the at least one network device indicates the state of the data duplication and transmission function configured by the first network device for the first DRB through a first bit in a bitmap, and the processor is further configured to execute instructions stored in the memory to perform following operations:
   acquiring the bitmap sent by the first network device; and
   determining a value of the first bit corresponding to the first DRB in the bitmap as the transmission control information of the first network device.

16. The terminal device of claim 10, wherein the processor is further configured to execute instructions stored in the memory to perform following operations:
   controlling the first DRB to transmit duplicated data if the target state is the active state; and
   controlling the first DRB to transmit non-duplicated data if the target state is the inactive state.

17. The terminal device of claim 10, wherein the transmission control information is carried in media access control (MAC) signaling.

18. A non-transitory computer readable medium, comprising instructions stored thereon, wherein the instructions, when executed by a processor, cause the processor to perform following operations:
   acquiring transmission control information of each of at least one network device, wherein the transmission control information of the each of the at least one network device is used for indicating a state of a data duplication and transmission function configured by a corresponding network device for a first data radio bearer (DRB), and the state is an active state or an inactive state;
   updating a control variable according to the transmission control information of the each of the at least one network device, wherein the control variable is used for maintaining states of the data duplication and transmission function configured by a plurality of network devices for the first DRB, a terminal device maintains one control variable for each split bearer configured with the data duplication and transmission function, and the plurality of network devices comprise the at least one network device; and controlling the data duplication and transmission function of the first DRB according to the updated control variable;

wherein controlling the data duplication and transmission function of the first DRB according to the updated control variable, comprises:

determining a target state of the data duplication and transmission function of the first DRB according to the updated control variable and a first mapping relation table, wherein the first mapping relation table comprises a mapping relation between a plurality of state combinations and a plurality of target states, and each state in a state combination corresponds to each of the plurality of network devices one by one; wherein the terminal device saves a mapping relation table in advance for each split bearer configured with the data duplication and transmission function, and the mapping relation table includes combinations of states able to be configured by all network devices capable of activating or deactivating a corresponding split bearer for the data duplication and transmission function of the corresponding split bearer, and target states that the data duplication and transmission function of the corresponding split bearer should be in under the combinations of states; and controlling the data duplication and transmission function of the first DRB according to the target state.

\* \* \* \* \*